(12) United States Patent
Brubaker et al.

(10) Patent No.: US 8,764,307 B2
(45) Date of Patent: Jul. 1, 2014

(54) ROLLER THRUST BEARING VIBRATION ISOLATOR

(75) Inventors: Justin Brubaker, Greenville, SC (US); Dana Patoine, Simpsonville, SC (US); Christopher Bean, Simpsonville, SC (US)

(73) Assignee: Koyo Bearings USA LLC, Westlake, OH (US)

(*) Notice: Subject to any disclaimer, the term of this patent is extended or adjusted under 35 U.S.C. 154(b) by 113 days.

(21) Appl. No.: 13/170,455

(22) Filed: Jun. 28, 2011

(65) Prior Publication Data

US 2012/0106887 A1    May 3, 2012

Related U.S. Application Data

(60) Provisional application No. 61/408,224, filed on Oct. 29, 2010.

(51) Int. Cl.
*F16C 23/00* (2006.01)
*B32B 3/28* (2006.01)

(52) U.S. Cl.
USPC ........... 384/620; 428/167; 428/66.4; 248/638

(58) Field of Classification Search
USPC ......... 384/536, 611, 618, 619, 633, 620, 626; 428/66.1, 66.2–66.7, 167; 248/638; 267/141, 293, 292, 141.2
See application file for complete search history.

(56) References Cited

U.S. PATENT DOCUMENTS

| | | | |
|---|---|---|---|
| 1,380,622 A | | 6/1921 | Winn |
| 3,831,923 A | * | 8/1974 | Meldrum ................. 267/141 |
| 4,109,977 A | * | 8/1978 | Stephan .................. 384/454 |
| 4,130,325 A | * | 12/1978 | Schultenkamper .......... 384/425 |
| 4,699,530 A | * | 10/1987 | Satoh et al. ............... 384/609 |
| 4,883,374 A | | 11/1989 | Rhoads et al. |

(Continued)

FOREIGN PATENT DOCUMENTS

| | | |
|---|---|---|
| BE | 522004 | 10/1955 |
| CN | 101010521 A | 8/2007 |

(Continued)

OTHER PUBLICATIONS

Office Action dated Aug. 31, 2012 for co-pending German Patent Application No. 10 2011 108 319.0.

(Continued)

*Primary Examiner* — Alan B Waits
(74) *Attorney, Agent, or Firm* — Nelson Mullins Riley & Scarborough, LLP (57) ABSTRACT

A vibration isolator for use between a support structure and a roller thrust bearing including a first race, a second race, a bearing cage and at least one roller element. The vibration isolator includes a radially extending portion with a mating surface, a bearing surface, an inner peripheral edge and an outer peripheral edge, the radially extending portion being substantially disk-shaped. An annular flange extends axially from one of the inner peripheral edge and the outer peripheral edge of the radially extending portion, and at least one groove is defined by the mating surface of the radially extending portion. The bearing surface is configured to abut one of the first race and the second race and the mating surface is configured to abut the support structure such that a void is defined between the at least one groove and the support structure.

18 Claims, 6 Drawing Sheets

(56) References Cited

U.S. PATENT DOCUMENTS

| | | | |
|---|---|---|---|
| 4,981,373 A | 1/1991 | Bando | |
| 5,044,785 A | 9/1991 | Bair et al. | |
| 5,123,625 A * | 6/1992 | Spaltofski | 248/634 |
| 5,529,400 A | 6/1996 | Polinsky et al. | |
| 5,918,987 A | 7/1999 | Sundquist et al. | |
| 5,967,674 A | 10/1999 | Reubelt et al. | |
| 6,196,721 B1 | 3/2001 | Farkaly | |
| 6,342,287 B1 * | 1/2002 | Kaczmarek et al. | 428/156 |
| 7,628,542 B2 | 12/2009 | Wada et al. | |
| 8,328,430 B2 | 12/2012 | Masuda et al. | |

FOREIGN PATENT DOCUMENTS

| | | |
|---|---|---|
| CN | 101208528 A | 6/2008 |
| DE | 1788231 | 5/1959 |
| DE | 1870235 | 4/1963 |
| DE | 19932019 | 1/2000 |
| DE | 102005007986 | 8/2006 |
| FR | 1536705 | 8/1968 |
| FR | 2222895 | 10/1974 |
| JP | 2007-187214 | 7/2007 |
| JP | 2007187214 | 7/2007 |
| JP | 2007-255489 | 10/2007 |
| JP | 2008240753 A | 10/2008 |

OTHER PUBLICATIONS

Notice of Preliminary Rejection dated Feb. 22, 2013 for co-pending Korean patent application 10-2011-97896.

First Office Action dated Nov. 26, 2013 for Chinese Patent Application No. 201110300511.1.

* cited by examiner

ROLLER THRUST BEARING VIBRATION ISOLATOR

CLAIMS OF PRIORITY

This application claims priority to U.S. Provisional Application Ser. No. 61/408,224, filed Oct. 29, 2010, the entire disclosure of which is incorporated by reference herein.

FIELD OF THE INVENTION

The present invention relates generally to roller thrust bearings. More particularly, the present invention relates to a vibration isolator for use in connection with a roller thrust bearing.

BACKGROUND OF THE INVENTION

The use of vibration isolators with roller thrust bearings is known. For example, vibration isolators are often used with roller thrust bearings that are disposed between an internal component, such as a rotating shaft, which passes through the roller thrust bearing, and the support structure of the internal component, such as a housing. Typical vibration isolators are constructed of a material that is suitable for dampening the vibrations that can be caused by, or passed through, the roller thrust bearing to the support structure. For known vibration isolators, further reductions in the vibrations transferred to the support structure require that the width of the vibration isolator in the axial direction be increased. However, the amount of axial and radial space for the roller thrust bearings and associated vibration isolators is often very limited. As such, it is desirable that the roller thrust bearings and their associated vibration isolators are as compact as possible in the axial direction.

The present invention recognizes and addresses considerations of prior art constructions and methods.

SUMMARY OF THE INVENTION

One embodiment of the present invention provides a vibration isolator for use between a support structure and a roller thrust bearing including a first race, a second race, a bearing cage and at least one roller element. The vibration isolator includes a radially extending portion with a mating surface, a bearing surface, an inner peripheral edge and an outer peripheral edge, the radially extending portion being substantially disk-shaped. An annular flange extends axially from one of the inner peripheral edge and the outer peripheral edge of the radially extending portion, and at least one groove is defined by the mating surface of the radially extending portion. The bearing surface is configured to abut one of the first race and the second race and the mating surface is configured to abut the support structure such that a void is defined between the at least one groove and the support structure.

Another embodiment of the present invention provides a roller thrust bearing assembly for use with a support structure including a roller thrust bearing with a first race, a second race and a plurality of roller elements disposed therebetween. The vibration isolator includes a radially extending portion with a mating surface, a bearing surface, an inner peripheral edge and an outer peripheral edge, the radially extending portion being substantially disk-shaped. An annular flange extends axially from one of the inner peripheral edge and the outer peripheral edge of the radially extending portion. At least one groove is defined by the mating surface of the radially extending portion. The bearing surface is configured to abut one of the first race and the second race of the roller thrust bearing and the mating surface is configured to abut the support structure such that a void is defined between the at least one groove and the support structure.

Another embodiment of the present invention provides a vibration isolator for use between a support structure and a roller thrust bearing including a first race, a second race, a bearing cage and at least one roller element, including a radially extending portion with a mating surface, a bearing surface, an inner peripheral edge and an outer peripheral edge, the radially extending portion being substantially disk-shaped, and at least one groove defined by the mating surface of the radially extending portion. The bearing surface is configured to abut one of the first race and the second race and the mating surface is configured to abut the support structure such that a void is defined between the at least one groove and the support structure.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
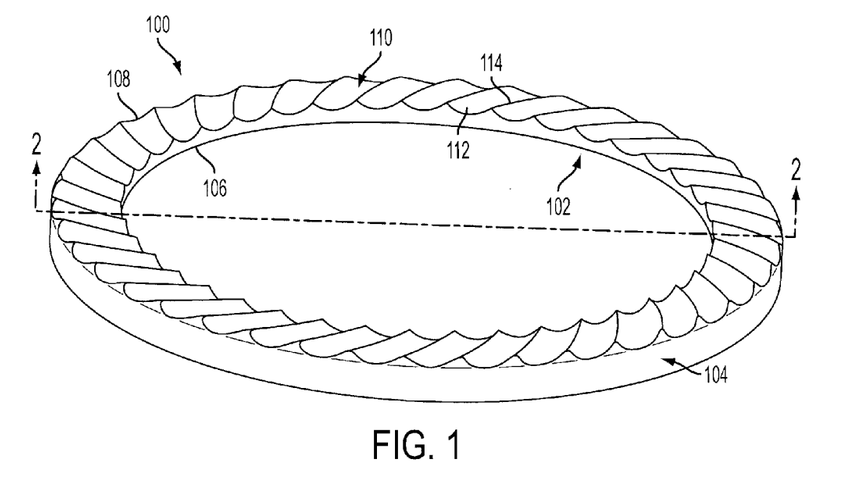
FIG. 1 is a perspective view of a vibration isolator for use with a roller thrust bearing
Figure 2:
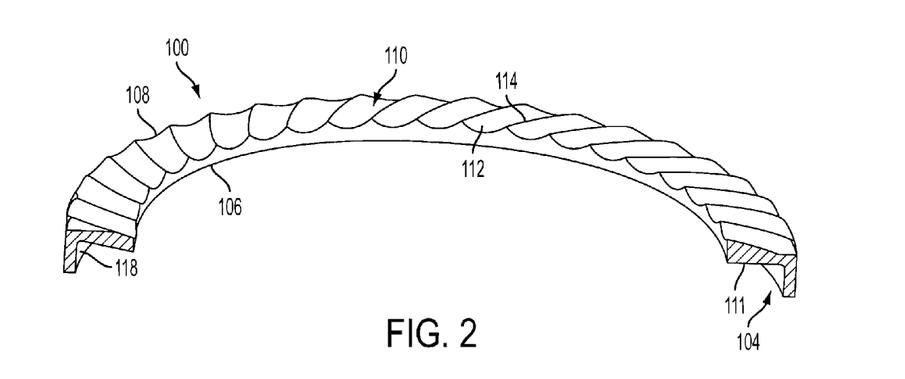
FIG. 2 is a partial, cross-sectional view of the vibration isolator shown in FIG. 1, taken along line 2-2.

Referring now to the figures, as shown in FIGS. 1 and 2, an embodiment of a vibration isolator 100 in accordance with the present invention includes a substantially disk-shaped radially extending portion 102 and an annular flange 104 extending axially therefrom. Radially extending portion 102 includes an inner peripheral edge 106 and an outer peripheral edge 108 and, in the preferred embodiment shown, annular flange 104 extends axially from outer peripheral edge 108. Additionally, radially extending portion 102 includes a mating surface 110 and a bearing surface 111 extending between inner peripheral edge 106 and outer peripheral edge 108, and annular flange 104 defines a cylindrical inner surface 118. Bearing surface 111 of radially extending portion 102 and inner surface 118 of annular flange 104 are configured to frictionally receive a portion of a corresponding roller thrust bearing 131 (FIG. 4), thereby securing vibration isolator 100 to roller thrust bearing 131. Note, however, alternate embodiments of vibration isolators in accordance with the present invention can be mechanically fixed, such as by riveting, staking, adhering, etc., to the corresponding roller thrust bearing rather than being frictionally retrained by annular flange 104, meaning annular flange 104 can be omitted in those embodiments if desired.

As shown, mating surface 110 includes a plurality of grooves 112, each groove being a swept arc extending radially outwardly from inner peripheral edge 106 to outer peripheral edge 108 of radially extending portion 102. Each pair of adjacent grooves 112 defines a ridge 114 therebetween. In the embodiment shown, each ridge 114 has a substantially angular cross-section forming an elongated peak. Mating surface 110 is configured to be disposed adjacent a corresponding surface within a stationary housing 190 (FIG. 5) which supports a rotatable internal component, as discussed in greater detail below. Preferably, vibration isolator 100 is constructed of an elastomeric material exhibiting desirable vibration dampening properties. Examples of such materials include, but are not limited to, elastomers, polymers, nylon, teflon, polythalamides, etc.

Figure 3:
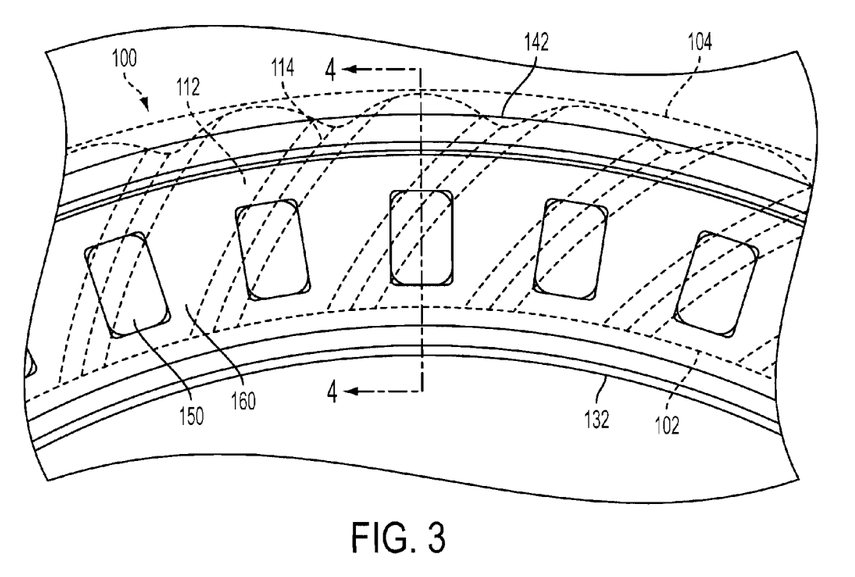
FIG. 3 is a partial top view of the vibration isolator shown in FIG. 1, used in connection with a roller thrust bearing.
Figure 4:
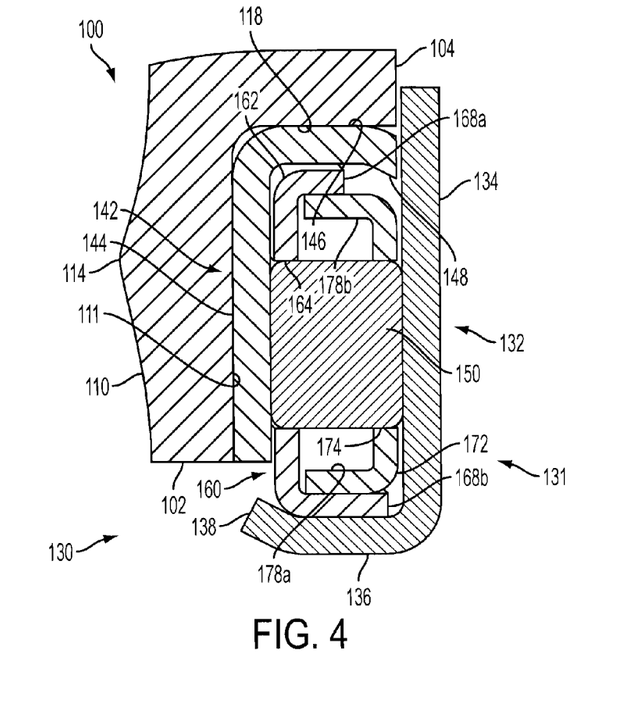
FIG. 4 is a partial, cross-sectional view of the vibration isolator and roller thrust bearing shown in FIG. 3, taken along line 4-4.

Referring now to FIGS. 3 and 4, vibration isolator 100 is frictionally secured to roller thrust bearing 131, thereby forming a roller thrust bearing assembly 130 that can be handled as a self-contained, fully assembled unit. Roller thrust bearing 131 includes an inner race 132, an outer race 142, a plurality of roller elements 150 and a bearing cage 160. Inner race 132 includes a radially extending portion 134, an annular flange 136 extending axially therefrom, and a circumferential lip 138 depending inwardly from a distal end of annular flange 136. Similarly, outer race 140 includes a radially extending portion 144, an annular flange 146 extending axially therefrom, and a circumferential lip 148 depending inwardly from a distal edge of annular flange 146. The inner surfaces of radially extending portion 134 and radially extending portion 144 serve as raceways for roller elements 150. Bearing cage 160 includes a first portion 162 and a second portion 172 that are fixed together by pairs of interlocking annular flanges 168a/168b and 178a/178b that extend between corresponding radially directed portions 166 and 176, respectively. Each roller element 150 is rotatably received in bearing apertures 164 and 174 formed in radially directed portions 166 and 176 of first portion 162 and second portion 172, respectively. Bearing cage 160 and corresponding roller elements 150 are retained between inner race 132 and outer race 142 by circumferential lips 138 and 148.

In the embodiment shown, vibration isolator 100 is secured to outer race 142 such that bearing surface 111 is adjacent an outer surface of the outer race's radially extending portion 144 and inner surface 118 of annular flange 104 is adjacent an outer surface of the outer race's annular flange 146. Note, mating surface 110 of vibration isolator 100 is preferably a solid, planar surface in order to maximize support of the raceway formed by the inner surface of radially extending portion 144 of outer race 142. As best seen in FIG. 3, each groove 112 is swept in a clockwise direction as it extends radially outwardly from inner peripheral edge 106 to outer peripheral edge 108 of mating surface 110. As such, neither grooves 112 nor corresponding ridges 114 are aligned with the longitudinal center axes of roller elements 150. This results in at least a portion of each roller element 150 being continuously disposed opposite a corresponding ridge 114 such that it is supported by the full axial width of vibration isolator 100 when installed in stationary housing 190. Preferably, the number of grooves 112 defined by mating surface 110 is not a multiple of the number of roller elements 150 of the associated roller thrust bearing 131.

Additionally, the distance between corresponding ridges 114 is greater at outer peripheral edge 108 than at inner peripheral edge 106. Note, in alternate embodiments of the vibration isolator, the grooves are of uniform width as they extend radially outwardly and the ridges have a greater width at the outer peripheral edge of the mating surface compared to their width at the inner peripheral edge. As well, alternate embodiments of the vibration isolator include grooves that are either swept in the counter-clockwise direction as they extend radially outwardly or they are not swept as they extend radially outwardly.

Figure 5:
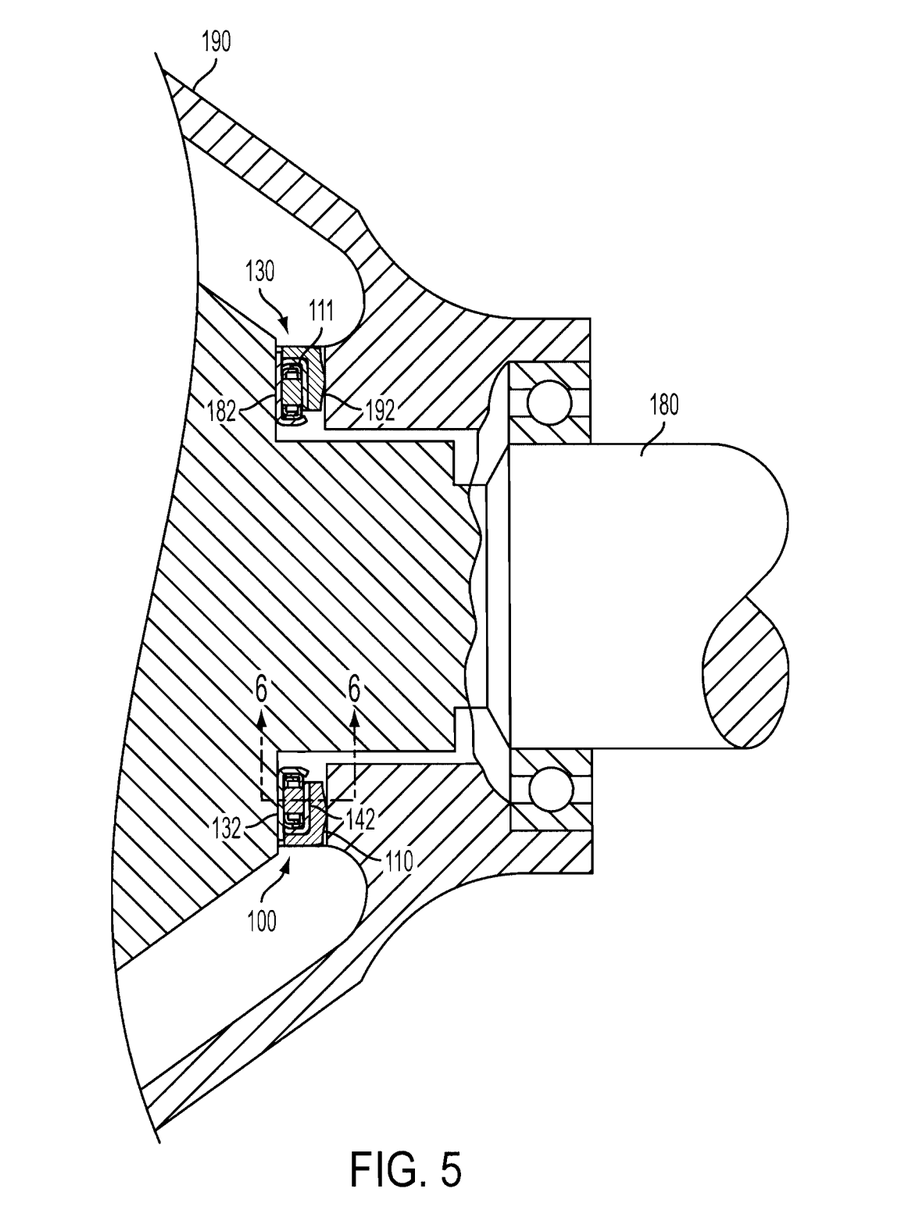
FIG. 5 is a side cross-sectional view of the vibration isolator and roller thrust bearing shown in FIG. 3, as installed in a stationary housing about a rotatable shaft.
Figure 6:
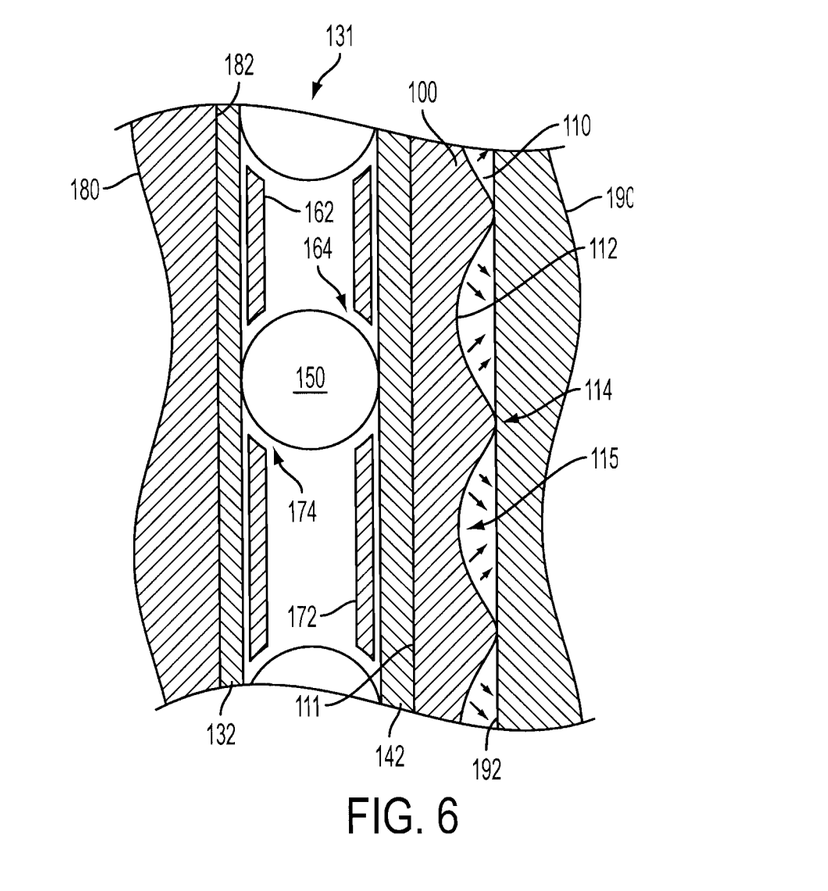
FIG. 6 is a partial cross-sectional view of the vibration isolator and roller thrust bearing, taken along line 6-6 of FIG. 5.

Referring now to FIG. 5, roller thrust bearing assembly 130 shown in FIGS. 3 and 4 is installed between stationary housing 190 and a rotatable shaft 180 supported therein. As shown, roller thrust bearing assembly 130 is mounted such that mating surface 110 of vibration isolator 100 is disposed adjacent a radially extending surface 192 of stationary housing 190, and an outer surface of the radially extending portion of inner race 132 is disposed adjacent a radially extending surface 182 of rotatable shaft 180. As best seen in FIG. 6, in this configuration, ridges 114 of mating surface 110 support roller thrust bearing 131 on radially extending surface 192, whereas grooves 112 form voids 115 with radially extending surface 192. As represented by the arrows disposed within voids 115, voids 115 facilitate scattering vibrations passed through, or caused by, roller thrust bearing 131 rather than transmitting the vibrations into stationary housing 190.

As such, grooves 112 provide increased vibration reduction as compared to a vibration isolator of the same axial width without having to increase the axial width that does not include such grooves of vibration isolator 100. Similarly, for a desired level of vibration reduction, grooves 112 allow the axial width of vibration isolator 100 to be reduced as compared to a vibration isolator that does not include grooves without adversely affecting the level of vibration reduction. Note, although vibration isolator is shown adjacent radially extending surface 192 of stationary housing 190, vibration isolator 100 can alternatively be disposed adjacent radially extending surface 182 of rotatable shaft 180. As well, a vibration isolator 100 can be positioned on each side of the roller thrust bearing such that a vibration isolator is adjacent both rotatable shaft 180 and stationary housing 190.

Figure 7:
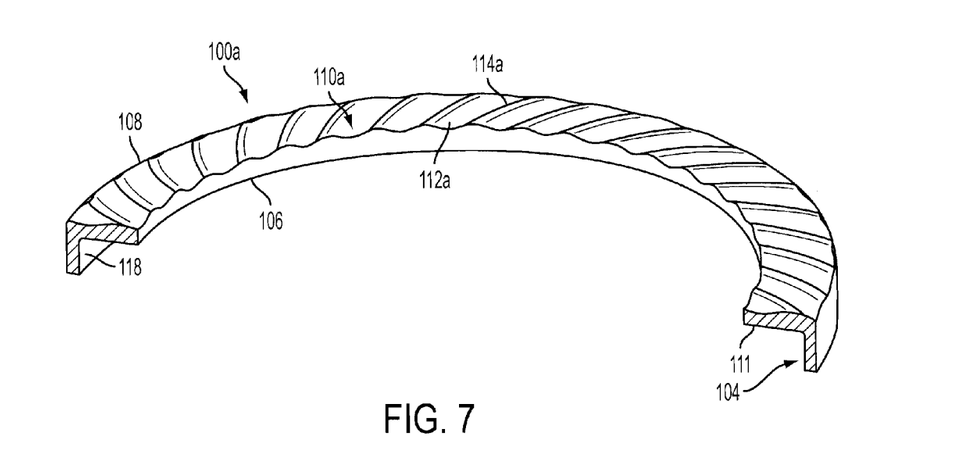
FIG. 7 is a partial perspective, cross-sectional view of an alternate embodiment of a vibration isolator in accordance with the present disclosure.
Figure 8:
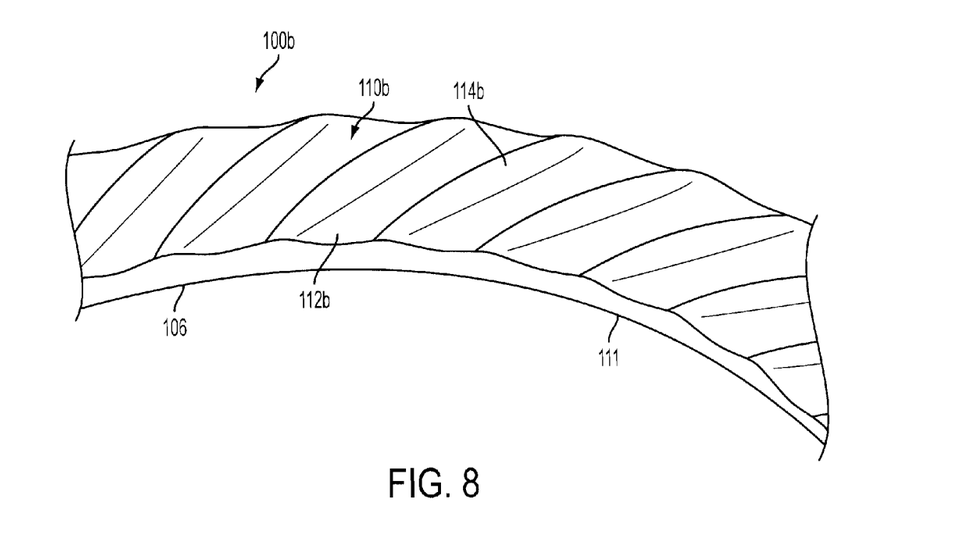
FIG. 8 is a partial perspective, cross-sectional view of an alternate embodiment of a vibration isolator in accordance with the present disclosure.

Referring now to FIG. 7, an alternate embodiment of a vibration isolator 100a in accordance with the present disclosure is shown. Vibration isolator 100a is substantially similar to vibration isolator 100 shown in FIGS. 1A and 2, with only those elements that differ receiving alternate reference numerals. As shown, vibration isolator 100a differs primarily from the previously discussed vibration isolator 100 in that the outermost portion of each ridge 114a disposed between adjacent grooves 112a has a substantially rounded cross-sectional profile such that alternating grooves 112a and ridges 114a give mating surface 110a an undulating profile, as best seen at inner peripheral surface 106. Referring additionally to FIG. 8, another alternate embodiment of a vibration isolator 100b is shown. Vibration isolator 100b differs primarily from vibration isolator 100a shown in FIG. 7 in that the outermost portion of each ridge 114b is defined by a substantially flattened surface that is substantially parallel to planar bearing surface 111b, as best seen in the profile of mating surface 110b at inner peripheral edge 106.

Figure 9A:
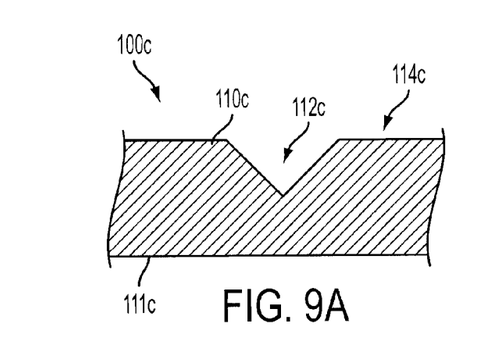
FIGS. 9A, 9B and 9C are partial side, cross-sectional views of alternate embodiments of vibration isolators in accordance with the present disclosure.
Figure 9B:
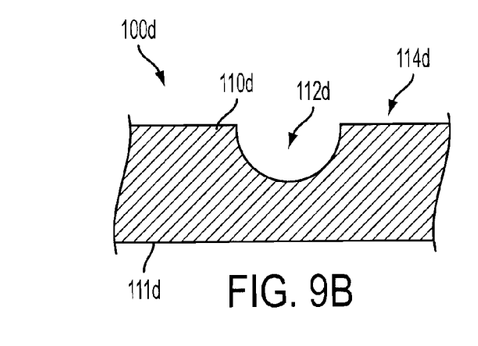
Figure 9C:
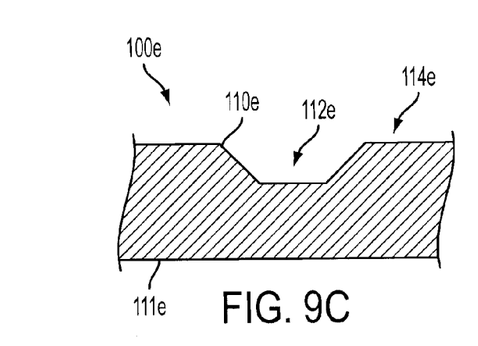

Referring now to FIGS. 9A, 9B and 9C, additional alternate embodiments of vibration isolators 100c, 100d and 100e are shown, in which the cross-sectional profiles of grooves 112c, 112d and 112e are triangular, semi-circular, and trapezoidal, respectively. Note, the cross-sectional profiles of the grooves and corresponding ridges of the vibration isolator may be configured in any shape that is found suitable for the intended purpose of the vibration isolator.

While one or more preferred embodiments of the invention are described above, it should be appreciated by those skilled in the art that various modifications and variations can be made in the present invention without departing from the scope and spirit thereof. For example, the cross-sectional shapes of the grooves may be of any shape found to be suitable for the intended purpose. Additionally, the vibration isolator may be constructed of any material found to be suitable for the intended purpose. It is intended that the present invention cover such modifications and variations as come within the scope and spirit of the appended claims and their equivalents.

What is claimed is:

1. A vibration isolator for use between a support structure and a roller thrust bearing including a first race, a second race, a bearing cage and at least one roller element, comprising:
   a radially extending portion with a mating surface, a bearing surface, an inner peripheral edge and an outer peripheral edge, the radially extending portion being substantially disk-shaped;
   an annular flange extending axially from one of the inner peripheral edge and the outer peripheral edge of the radially extending portion; and
   the mating surface of the radially extending portion defining a plurality of ridges and a plurality of grooves, each groove being disposed between adjacent ridges, and each ridge having a substantially angular cross-section along its length, thereby forming an angular peak along an outermost portion of each ridge,
   wherein the bearing surface is configured to abut one of the first race and the second race, the angular peaks of the mating surface are configured to abut the support structure such that a plurality of voids is defined between the plurality of grooves and the support structure, and each ridge extends radially outwardly from the inner peripheral edge to the outer peripheral edge of the radially extending portion.

2. The vibration isolator of claim 1, wherein each groove extends radially outwardly from the inner peripheral edge to the outer peripheral edge of the radially extending portion.

3. The vibration isolator of claim 2, wherein each groove is curved relative to a longitudinal center axis of the at least one roller element.

4. The vibration isolator of claim 2, wherein the annular flange is continuous.

5. The vibration isolator of claim 2, wherein the vibration isolator is comprised of an elastomeric material.

6. The vibration isolator of claim 2, wherein the annular flange extends axially from the inner peripheral edge of the radially extending portion.

7. The vibration isolator of claim 2, wherein the annular flange extends axially from the outer peripheral edge of the radially extending portion.

8. The vibration isolator of claim 2, wherein a first width of each groove at the outer peripheral edge of the radially extending portion is greater than a second width of each groove at the inner peripheral edge of the radially extending portion.

9. The vibration isolator of claim 1, wherein each ridge further comprises a substantially flattened surface.

10. A roller thrust bearing assembly for use with a support structure, comprising:
    a roller thrust bearing with a first race, a second race and a plurality of roller elements disposed therebetween;
    a vibration isolator comprising:
      a radially extending portion with a mating surface, a bearing surface, an inner peripheral edge and an outer peripheral edge, the radially extending portion being substantially disk-shaped;
      an annular flange extending axially from one of the inner peripheral edge and the outer peripheral edge of the radially extending portion; and
      the mating surface of the radially extending portion defining a plurality of ridges and a plurality of grooves, each groove being disposed between adjacent ridges, and each ridge having a substantially rounded cross-section along its length, thereby forming a rounded peak along an outermost portion of each ridge,
      wherein the bearing surface is configured to abut one of the first race and the second race of the roller thrust bearing, the rounded peaks of the mating surface are configured to abut the support structure such that a plurality of voids is defined between the plurality of grooves and the support structure, and each ridge extends radially outwardly from the inner peripheral edge to the outer peripheral edge of the radially extending portion.

11. The roller thrust bearing assembly of claim 10, wherein each groove extends radially outwardly from the inner peripheral edge to the outer peripheral edge of the radially extending portion.

12. The roller thrust bearing assembly of claim 11, wherein each groove is curved relative to a longitudinal center axis of the at least one roller element.

13. The roller thrust bearing assembly of claim 11, wherein the annular flange extends axially from the outer peripheral edge of the radially extending portion of the vibration isolator.

14. The roller thrust bearing assembly of claim 10, wherein a portion of at least one of the plurality of ridges is disposed between each roller element and the support structure at all times as each roller element traverses the one of the first race and the second race.

15. A vibration isolator for use between a support structure and a roller thrust bearing including a first race, a second race, a bearing cage and at least one roller element, comprising:

a radially extending portion with a mating surface, a bearing surface, an inner peripheral edge and an outer peripheral edge, the radially extending portion being substantially disk-shaped; and the mating surface of the radially extending portion defining a plurality of ridges and a plurality of grooves, each groove being disposed between adjacent ridges, and each ridge having a substantially rounded cross-section along its length, thereby forming a rounded peak along an outermost portion of each ridge, wherein the bearing surface is configured to abut one of the first race and the second race, the rounded peaks of the mating surface are configured to abut the support structure such that a plurality of voids is defined between the plurality of grooves and the support structure, and each ridge extends radially outwardly from the inner peripheral edge to the outer peripheral edge of the radially extending portion.

16. The vibration isolator of claim 15, each groove extends radially outwardly from the inner peripheral edge to the outer peripheral edge of the radially extending portion.

17. The vibration isolator of claim 16, wherein each groove is curved relative to a longitudinal center axis of the at least one roller element.

18. The vibration isolator of claim 15, further comprising an annular flange extending axially from one of the inner peripheral edge and the outer peripheral edge of the radially extending portion.

* * * * *